United States Patent [19]

Morita et al.

[11] Patent Number: 5,572,286
[45] Date of Patent: Nov. 5, 1996

[54] HEAD FOR A COLOR ENLARGER

[75] Inventors: Tetsuo Morita, Ohmiya; Takekazu Yanagimoto, Kanagawa-ken, both of Japan

[73] Assignees: Fuji Photo Optical Co., Ltd., Saitama-ken; Fuji Photo Film Co., Ltd., Kanagawa-ken, both of Japan

[21] Appl. No.: 455,278

[22] Filed: May 31, 1995

[30] Foreign Application Priority Data

Jun. 1, 1994 [JP] Japan .................................. 6-142404
Jun. 1, 1994 [JP] Japan .................................. 6-142405

[51] Int. Cl.$^6$ .................................................. G03B 27/72
[52] U.S. Cl. ................................................................ 355/35
[58] Field of Search .................................... 355/71, 32, 35

[56] References Cited

U.S. PATENT DOCUMENTS

| | | | |
|---|---|---|---|
| 3,754,823 | 8/1973 | Weisglass et al. | 355/35 |
| 3,880,520 | 4/1975 | Weisglass | 355/37 |
| 4,191,466 | 3/1980 | Gandini | 355/35 |
| 4,893,149 | 1/1990 | Satou et al. | 355/67 |
| 5,008,701 | 4/1991 | Tokuda | 355/35 |

Primary Examiner—William J. Royer
Assistant Examiner—David A. Lane
Attorney, Agent, or Firm—Price, Heneveld, Cooper, DeWitt & Litton

[57] ABSTRACT

An arrangement of a color enlarger head is disclosed that allows an original picture negative to be irradiated for print-out with an even quantity of light without the need for adjusting a quantity of light transmitted through a diffuse transmission plate disposed on an exit side of a diffusion box. Them is provided below the diffusion box a light distribution adjusting box in which the light rays transmitted through the diffuse transmission plate are appropriately reflected so as to increase the quantity of light entering a peripheral zone of the original picture negative and thereby to equalize the light rays available to print out the original picture negative. Specifically, below The diffuse transmission plate 60 there is provided a light distribution adjusting box 62 defined by a frame 62a and a bottom 62b provided at a central zone with an opening serving as a projecting window 62c. The light rays having entered light distribution adjusting box 62 through a peripheral zone of diffuse transmission plate 60 are reflected not only by the inner surface but also by a lower surface of diffuse transmission plate 60 so that the light rays reflected by the lower surface of diffuse transmission plate 60 at a zone extending around its central zone enter the peripheral zone of original picture negative 66 and then an enlarged lens 42 while the light rays reflected by the lower surface of the diffuse transmission plate at its central zone enter the original picture negative but do not enter enlarging lens 42.

32 Claims, 6 Drawing Sheets

HEAD FOR A COLOR ENLARGER

BACKGROUND OF THE INVENTION

1. Field of the Invention

The present invention relates to an arrangement of a color enlarger head having a diffusion box including a scattering type light diffusion means to equalize respective colored light rays emitted from a light source and, more particularly, to an arrangement of a light distribution adjusting box for irradiation of an original picture negative with said light rays.

2. Description of the Related Art

Figure 5:
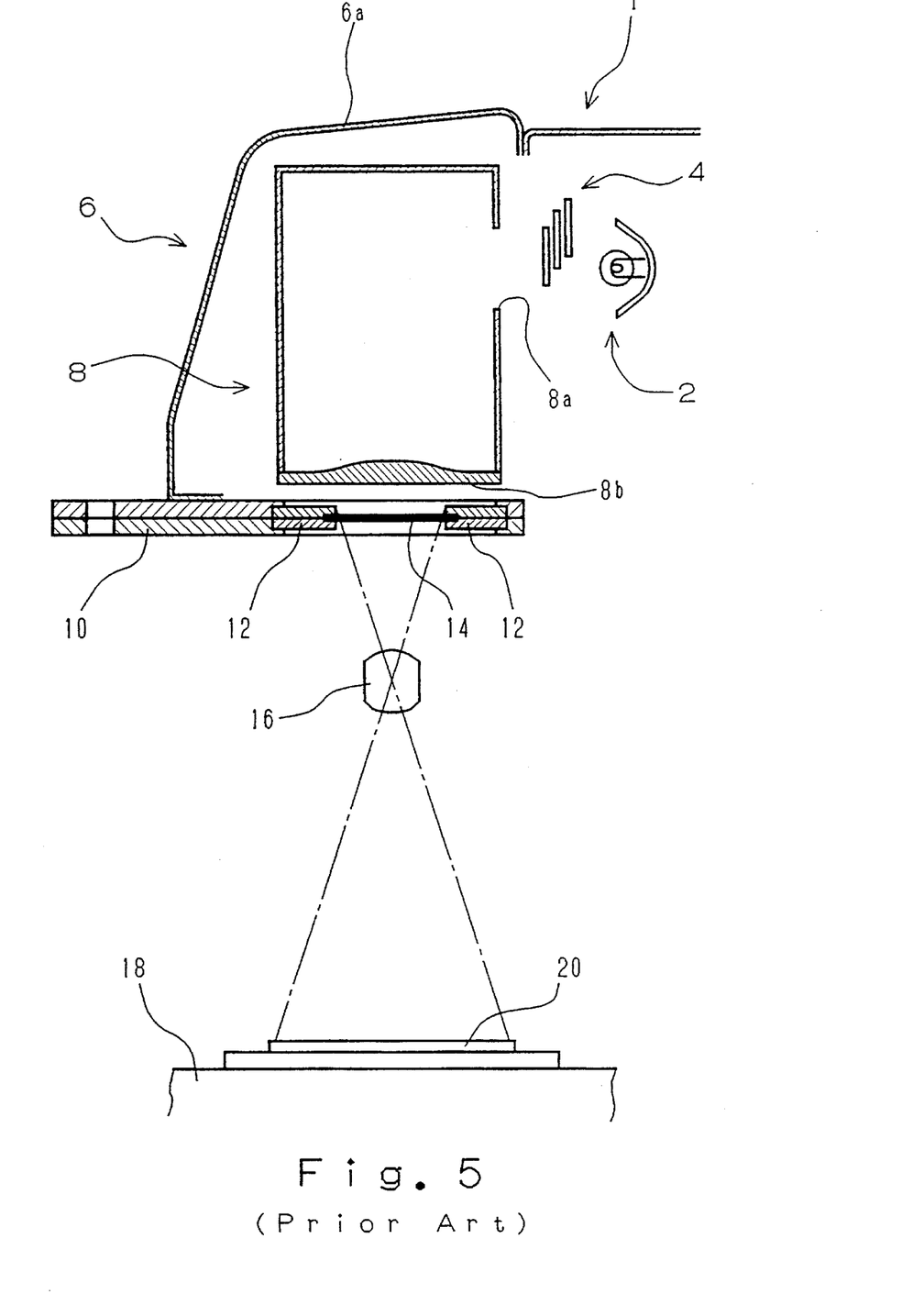
FIG. 5 is a view similar to FIG. 1, but exemplarily showing a head according to the prior art.

A color enlarger generally includes a light source, a head, a carrier, an enlarging lens, and a table. Referring to FIG. 5 of the accompanying drawings, light rays emitted from a source lamp 2 provided in a light source 1, are transmitted through filters 4 having appropriate color characteristics, thereby respectively coloring the light rays. The light rays then enter a diffusion box 8, which is part of the head 6, through an entrance window 8a. Diffusion box 8 has an inner surface made up of a diffuse reflector. The respectively colored light rays are diffusively reflected on the diffuse reflector in order to equalize the light rays and are then transmitted through a diffuse transmission plate 8b defining a bottom of the diffuse reflector.

A carrier 10 holds an original picture negative 14 by means of a mask 12. The original picture negative 14 is irradiated with the light rays transmitted through diffuse transmission plate 8b. Then, the light rays are transmitted through an enlarging lens 16. Thus, an image on the original picture negative 14 is projected onto a photographic paper 20 placed on a table 18.

Immediately before the light rays are projected out from diffusion box 8, the light rays reflected on the diffuse reflector, which defines the inner surface of diffusion box 8, tend to be concentrated to a central zone of diffuse transmission plate 8b. As it is well known, the quantity of light transmitted through diffuse transmission plate 8b is relatively large in the central zone and relatively small in the peripheral zone thereof. Consequently, such unevenness in the quantity of light sometimes disadvantageously results in the image projected on photographic paper 20 having a poor quantity of light in its peripheral zone.

One method to avoid this is to configure diffuse transmission plate 8b to be thicker in its central zone than in its peripheral zone. Such configuration will allow the quantity of light transmitted through the central zone to be reduced and thereby allow the diffuse transmission plate to transmit light rays of substantially equalized distribution. This reduces the tendency for the resultant printed picture to be affected by a deficient quantity of light in the peripheral zone and a resulting uneven enlargement due to such unevenness in the light distribution.

Figure 6:
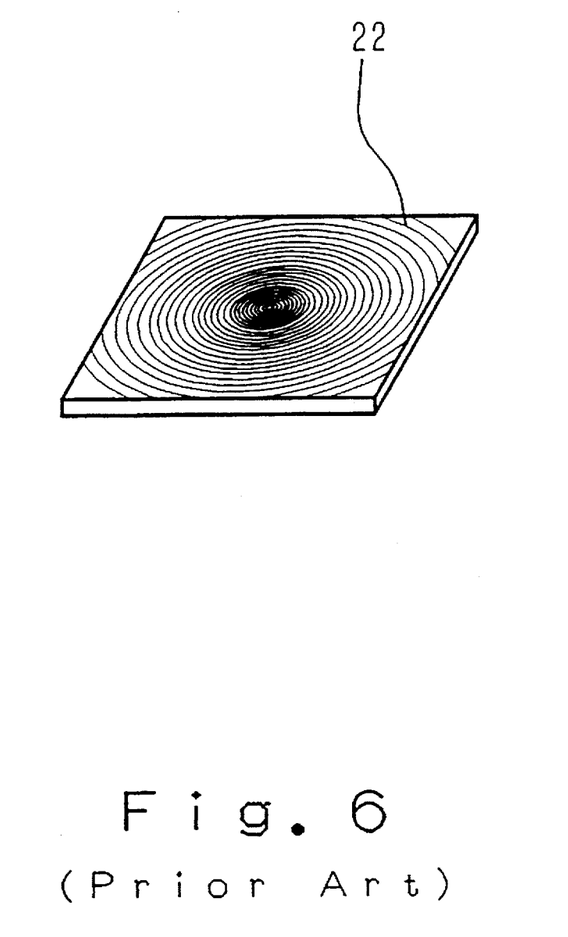
FIG. 6 is a perspective view showing an attenuating filter operatively associated with the diffuse transmission plate in another embodiment of a head according to the prior art.

Alternatively, diffuse transmission plate 8b may be configured to have a substantially uniform thickness. An attenuating filter 22 having a transmissivity lower in its central zone than in its peripheral zone, as shown by FIG. 6, may be provided at an appropriate location on a section of the optical axis extending from the diffuse transmission plate to the photographic paper 20. In this alternative arrangement, a distribution of the light rays transmitted through said diffuse transmission plate will be uneven but the distribution will be substantially equalized after the light rays have been transmitted through attenuating filter 22.

These techniques well known in the art, as described above, satisfactory provide that the quantity of light projected through the image on the original picture negative and onto the photographic paper 20 can be substantially equalized and further that the picture to be printed out can be protected from any adverse effect resulting from a deficient quantity of light in the peripheral zone.

However, diffuse transmission plate 8b of the above-mentioned particular configuration is required to attenuate the portion of the image at its central zone, which must start out relatively high in intensity, in order to equalize the overall light density of the image with which the photographic paper 20 is irradiated. Accordingly, the overall light density of the image can be equalized but on the basis of the typically low light density at the image peripheral zone. In other words, the quantity of light emitted from the source lamp 2 will be insufficiently utilized and the light that is attenuated will be wasted.

While the rated capacity of the source lamp 2 may be increased to increase the light density of the image, this will make both the light source 1 and the head 6 undesirably bulky and increase power consumption, which is an energy cost.

To change the size of the original picture negative used with the enlarger, carrier 10 is drawn out, original picture negative 14 and mask 12 are exchanged with new ones, and carrier 10 is reinserted. In addition, a head cover 6a is removed and diffusion box 8 is exchanged with one having a size corresponding to that of the new original picture negative 14. Furthermore, the density of light reaching photographic paper 20 depends on the size of the original picture negative 14. Therefore, the density of light with which the original picture negative is irradiated must also be changed by exchange of the diffusion box 8 to maintain the density of light available for irradiation of photographic paper 20 substantially at a constant level.

Such intricate operation of changing the size of the diffusion box has prevented the photographic enlarging operation from being rapidly performed. The conventional arrangement has required also that a plurality of diffusing boxes 8 be used according to the number of sizes of original picture negatives that are accommodated. This adds to the cost of the apparatus.

SUMMARY OF THE INVENTION

The invention provides an improved arrangement of the head of a color enlarger functioning not only to equalize but also to increase the density of the light emitted from an existing source lamp, with which the photographic paper is irradiated, to thereby obtain a high quantity of print-out.

The present invention further overcomes the difficulty of the prior art that requires a plurality of diffuser boxes to accommodate various original picture negative sizes. The present invention provides an improved color enlarger head arrangement that allows the size of the original picture negative to be changed without requiring that the diffusion box be changed.

The objects set forth above are achieved, according to the invention, by a color enlarger head arrangement including a scattering type light diffusion box that functions to diffuse light rays emitted from a light source through light filters in a manner that substantially equalizes the light rays, respectively colored by light filters, and projects the light rays onto an original picture negative. The head arrangement includes a mixing box having an inner surface serving as a diffuse reflector and a projecting window provided adjacent, and in opposition to, the original picture negative. A light distribution adjusting box is defined by transmitting means opposed to the projecting window and reflecting means provided adjacent a peripheral zone of said transmitting means. The light rays transmitted through the peripheral zone of the transmitting means, and then entering the light distribution adjusting box, are partially reflected by the reflecting means toward a zone extending around a central zone of the transmitting means and reflected by a lower surface of said transmitting means so as to then be transmitted through the original picture negative and an enlarging lens.

The reflecting means of the light distribution adjusting box preferably includes a frame extending downward substantially in a vertical direction from a peripheral edge of the transmitting means and a bottom extending from a lower end of the frame in parallel to the transmitting means and having a central opening. The transmitting means of the light distribution adjusting box preferably includes a diffuse transmission plate. More preferably, the transmitting means of said light distribution adjusting box includes a diffuse transmission plate having a uniform thickness. The reflecting means of said light distribution adjusting box preferably includes a diffuse reflector.

The objects set forth above are achieved, according to another aspect of the invention, by a color enlarger head arrangement provided with a scattering type light diffusion box that functions to diffuse light rays emitted from a light source through light filters so as to equalize the light rays, respectively colored by said filters, and then to project said light rays onto an original picture negative. The arrangement includes a mixing box having its inner surface serving as a diffuse reflector and a projecting window provided adjacent, and in opposition to, the original picture negative. A light distribution adjusting box is defined by transmitting means opposed to said projecting window and reflecting means provided adjacent a peripheral zone of said transmitting means. The light distribution adjusting box is removably attached to said mixing box. The light rays transmitted through the peripheral zone of said transmitting means and then entering said light distribution adjusting box are partially reflected by said reflecting means toward a zone extending around a central zone of said transmitting means and reflected by a lower surface of said transmitting means so as to be then transmitted through said original picture negative and an enlarging lens.

The transmitting means and the reflecting means of the light distribution adjusting box may be provided as separate members removably attached to said mixing box or may be provided as an integral unit removably attached to the mixing box.

The reflecting means of the light distribution adjusting box preferably includes a frame extending downward substantially in a vertical direction from a peripheral edge of said transmitting means and a bottom extending from a lower end of said frame in parallel to the transmitting means and having a central opening. Preferably, the transmitting means of the light distribution adjusting box includes a diffuse transmission plate. More preferably, the transmitting means of the light distribution adjusting box includes the diffuse transmission plate having a uniform thickness. The reflecting means of the light distribution adjusting box preferably includes a diffuse reflector.

In order to perform photographic enlarging, the source lamp is turned on. Light rays emitted from the source lamp are transmitted through the light filters of appropriately selected colors and enter the optical mixer in which the respectively colored light rays are diffusively reflected by the diffuse reflector so as to be equalized. The light rays are then projected out from the optical mixer through the projecting window. The light rays thus projected out are transmitted through transmitting means, such as a diffuse transmission plate provided adjacent and in opposition to said projecting window, and, thereafter, enter the light distribution adjusting box. The quantity of light transmitted through the diffuse transmission plate into the light distribution adjusting box is relatively large in the central zone and relatively small in the peripheral zone of the diffuse transmission plate.

The light rays transmitted through the central zone directly enter the original picture negative and are transmitted therethrough without being reflected by the reflecting means, while the light rays transmitted through said peripheral zone of said diffuse transmission plate are reflected by the reflecting means toward the zone extending around the central zone of said diffuse transmission plate. These light rays are then reflected by the lower surface of said diffuse transmission plate so as to be transmitted through the peripheral zone of the original picture negative. These light rays are then transmitted through the original picture negative as well as the enlarging lens so that the image on the original picture negative is projected on the photographic paper.

When the reflecting means is defined by the frame and the bottom of said light distribution adjusting box, the light rays transmitted through the peripheral zone of said diffuse transmission plate may follow any one of two different courses. These light rays may be reflected by said bottom and then by the lower surface of said diffuse transmission plate or may be reflected by said frame before they are reflected by said bottom and then by the lower surface of the diffuse transmission plate. In either case, all of the light rays transmitted through the peripheral zone of the diffuse transmission plate are directed toward the zone extending around the central zone, so that the quantity of light in the proximity of said central zone is increased. Consequently, the quantity of light entering the peripheral zone of the original picture negative is correspondingly increased.

The light rays reflected by the bottom and then by the lower surface of the diffuse transmission plate, at the central zone thereof, cannot reach the original picture negative. Even when they are transmitted through the original picture negative, they cannot be transmitted through the enlarging lens because the angle at which they are reflected on said central zone is excessively large. Therefore, there is no possibility that the density of light which is already large in said central zone when the light rays have been projected out from the optical mixer might be further increased.

Accordingly, the density of light transmitted through the original picture negative and then through the enlarging lens is substantially evenly distributed, with the density of light in the peripheral zone being practically equal to the maximum density of light in the central zone, so that a bright image can be projected onto the photographic paper without any significant unevenness.

To exchange an original picture negative with another original picture negative of the same size, the carrier is drawn out together with the original picture negative carried thereby. This original picture negative is then exchanged with a new original picture negative and the carrier now carrying this new original picture negative is reinserted. To exchange an original picture negative with another original picture negative of a different size, the carrier is drawn out together with the original picture negative carried thereby. The original negative, as well as the mask shading this original picture negative along its periphery, are exchanged with a new original picture negative and mask. The carrier is then reinserted together with the new original picture negative and mask carried thereby. With the head in the light distribution adjusting box being exchangeable, the light distribution adjusting box is also exchanged with one dimensioned so as to be suitable for the size of said new original picture negative.

Said light distribution adjusting box can be suited to the respective sizes of the original picture negative by appropriately dimensioning the transmitting means and the reflecting means. For example, an area as well as a thickness of the transmitting means, a height of the frame serving as the reflecting means, and an area of the bottom may be suitably dimensioned. A plurality of such light distribution adjusting boxes dimensioned to be suitable for the respective sizes may be provided and one of them may be detachably mounted in the head depending on the particular sizes of the original picture negative to be printed out.

DETAILED DESCRIPTION OF THE PREFERRED EMBODIMENTS

Figure 1:
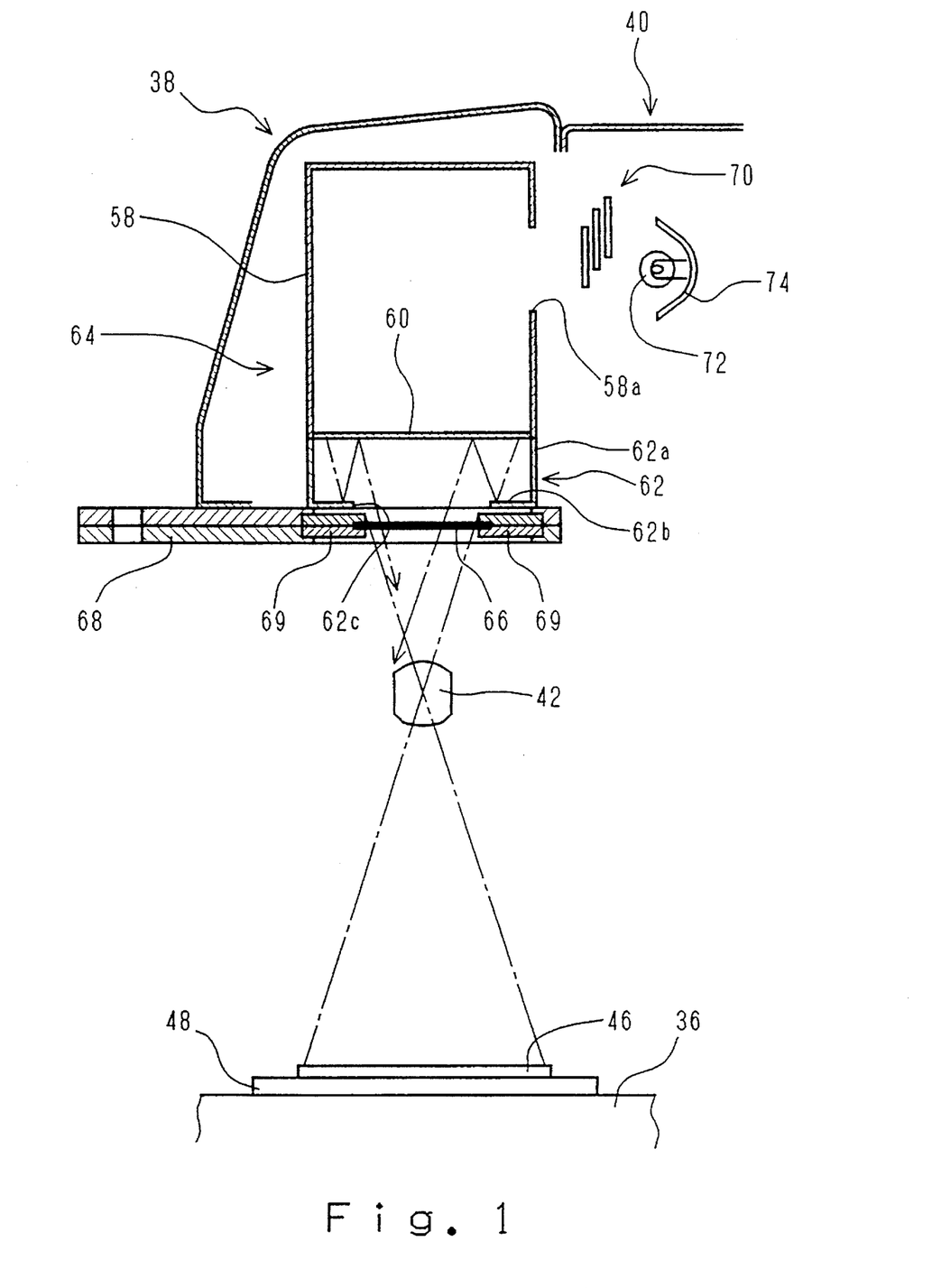
FIG. 1 is a sectional view schematically showing a first embodiment of a head according to the invention.
Figure 2:
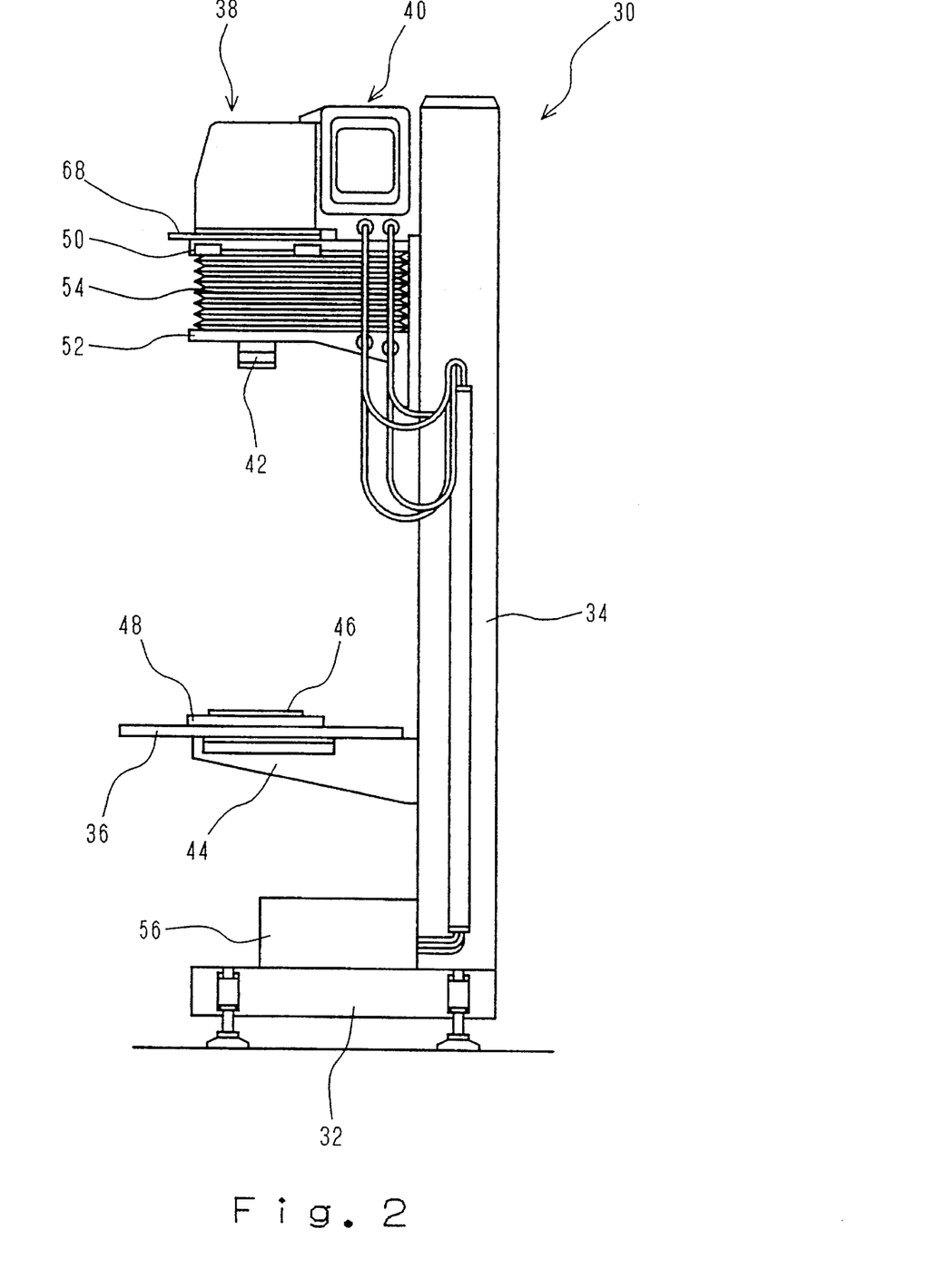
FIG. 2 is a schematic side view showing a color enlarger provided with the first embodiment of the head.
Figure 3:
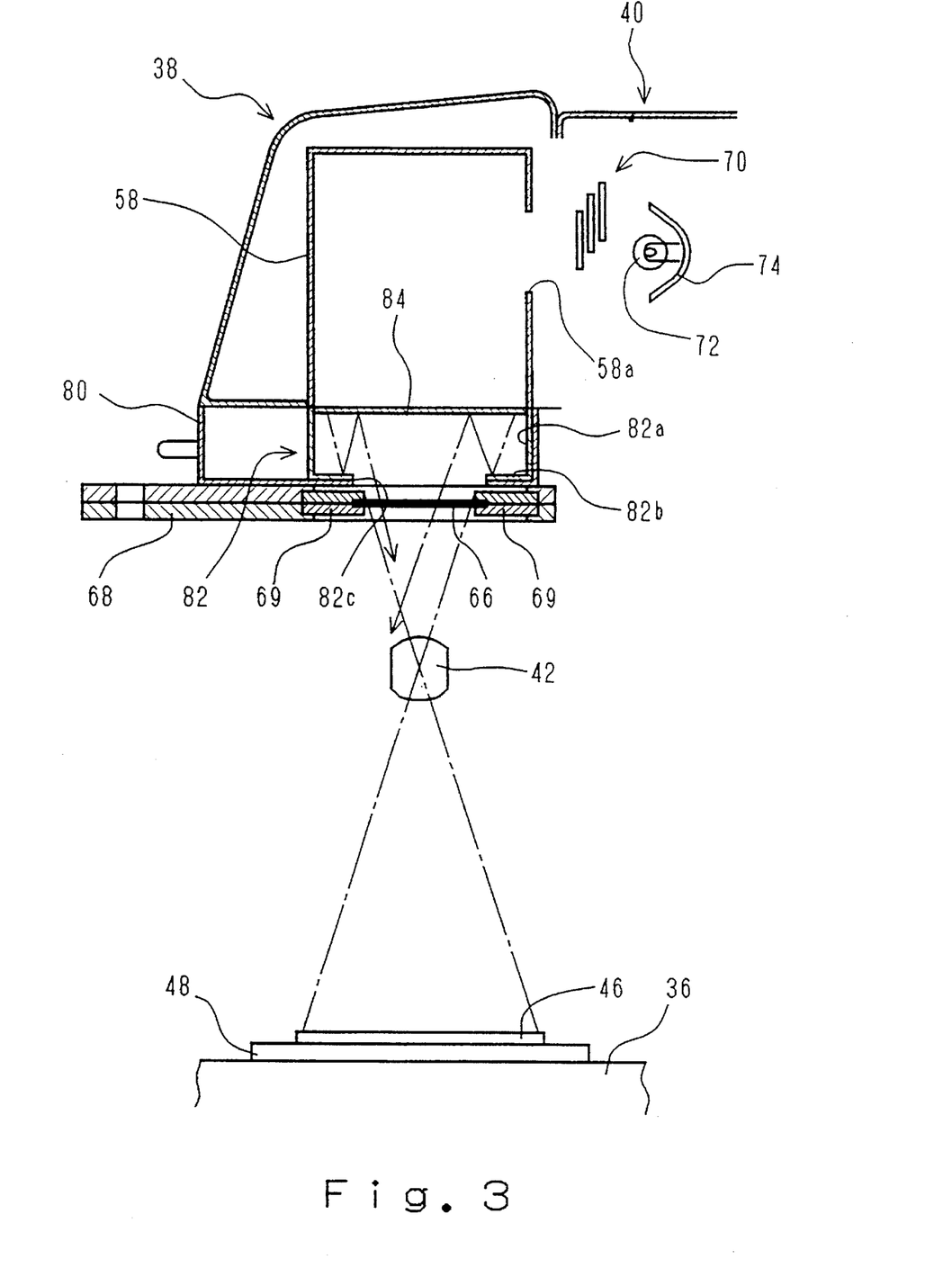
FIG. 3 is a sectional view schematically showing a second embodiment of a head according to the invention.
Figure 4:
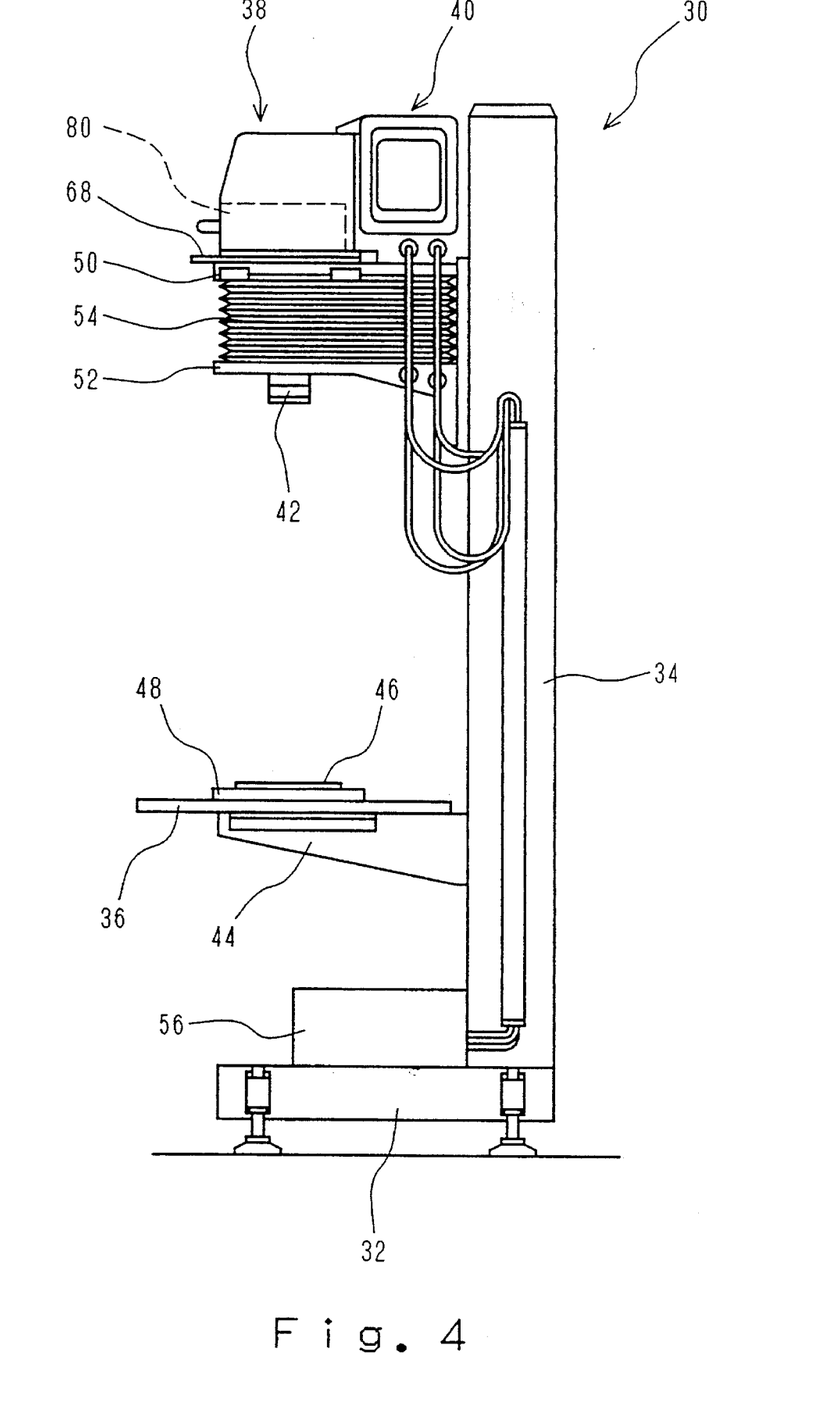
FIG. 4 is a schematic side view showing a color enlarger provided with the second embodiment of the head according to the invention.

The arrangement of a color enlarger head according to the invention will be described more specifically in reference with presently preferred embodiments shown by the accompanying drawings in which FIGS. 1 and 2 illustrate a first embodiment and FIGS. 3 and 4 illustrate a second embodiment of the invention.

Referring to FIG. 2, a color enlarger 30 generally includes a pedestal 32 and a column 34 mounted on said pedestal 32. Column 34 carries various components, such as a table 36, a head 38, a light source 40, and an enlarging lens 42.

Table 36 is supported by a bracket 44 adapted to be vertically movable relative to said column 34, and an easel 48 is placed on this table 36 to hold a sheet of photographic paper 46 in place. A head base plate 50 and a lens base plate 52 are mounted on the upper side of column 34 in a vertically movable manner. A head 38 and a light source 40 are provided on head base plate 50, and lens base plate 52 carries on its lower side an enlarging lens 42. Between head base plate 50 and lens plate 52 them is provided a bellows 54 for shading of ambient light, which is capable of expansion and contraction as head base plate 50 and lens base plate 52 are vertically moved. A control unit 56 is mounted on pedestal 32 and electrically connected to a source lamp of light source 40 as well as to means for vertically driving said plates 50, 52 in order to control these components.

Referring to FIG. 1, head 38 contains therein an optical mixer in the form of a diffusion box 58 of which the inner surface is defined by a diffuse reflector. Diffusion box 58 has an open bottom defining a projecting window 62c, as will be described later, and a side wall opposed to light source 40, which is formed at an appropriate location with an entrance window 58a.

Above the projecting window, diffusion box 58 contains transmitting means in the form of a diffuse transmission plate 60 having a substantially uniform thickness. A lower part of diffusion box 58 defines a light distribution adjusting box 62 having a frame 62a extending downward from a peripheral edge of diffuse transmission plate 60 and a bottom 62b extending inward from a lower end of frame 62a in parallel to diffuse transmission plate 60. Light distribution adjusting box 62 also has its inner surface defined by a diffuse reflector and its bottom formed with an appropriate-sized opening serving as projecting window 62c. As will be apparent from the illustration, diffuse transmission plate 60 cooperates with light distribution adjusting box 62 to define a light distribution adjuster and diffusion box 58 cooperates with diffuse transmission plate 60 and light distribution adjusting box 62 to define an optical diffuser 64.

A carrier 68 for an original picture negative 66 is attached to the lower side of light distribution adjusting box 62 and formed with a framed opening across which the original picture negative of a maximum size is held. When it is desired to hold the original picture negative 66 of a relatively small size by carrier 68, the original picture negative 66 is held by a mask 69 which is, in turn, held across the framed opening. Below original picture negative 66 there is placed enlarging lens 42 below which there are placed said pedestal 36, easel 48, and sheet of photographic paper 46.

Behind head 38, there is provided a light source 40 including filters 70 placed in opposition to entrance window 58a of said diffusion box 58. Filters 70 may include, for example, yellow, magenta, and cyan filters so that the colors to be printed out depend on quantities of light transmitted through the respective filters 70. Behind filters 70 there is placed a source lamp 72, which may be, for example, a halogen lamp or the like. Behind source lamp 72 there is provided a suitable reflector 74 configured so that the entire light rays emitted from source lamp 72 may enter diffusion box 58.

The embodiment of the color enlarger head according to the invention arranged as shown in FIGS. 1 and 2 operates as follows:

Before actual operation of photographic enlarging, original picture negative 66 is held in carrier 68 by means of mask 69 selected to be suitable for the size of this original picture negative 66 and then carrier 68 is inserted under head 38. The source lamp 72 is then turned on and light and filters 70 are adjusted.

The light rays emitted from source lamp 72 are transmitted through respective filters 70 into diffusion box 58 through entrance window 58a. Within diffusion box 58, the light rays are diffusively reflected by the inner surface defining the diffuse reflector. The respective colored light rays are thereby substantially equalized and any color unevenness of the light rays is eliminated. The light rays are then transmitted through diffuse transmission plate 60 provided adjacent the bottom of diffusion box 58 into light distribution box 62.

Most of the light rays transmitted through diffuse transmission plate 60 at the zone extending in the proximity of its central zone are projected out from light distribution adjusting box 62 through projecting window 62c formed in the bottom thereof. These light rays thus projected out are then transmitted through original picture negative 66 underlying entrance window 62c into enlarging lens 42 and are projected onto photographic paper 46. The rays transmitted through diffuse transmission plate 60 at the zone extending in proximity of its peripheral edge are diffusively reflected by the diffuse reflector defining the inner surface of light distribution adjusting box 62. These reflected light rays are partially reflected by the lower surface of diffuse transmission plate 60 at the zone extending in proximity of its central zone so as to enter original picture negative 66 and then the enlarging lens 42 and partially reflected by the lower surface of diffuse transmission plate 60 substantially at the central zone so as to enter original picture negative 66 but not enlarging lens 42. This is because an angle at which these partial light rays are reflected by the lower surface of diffuse transmission plate 60 is excessively large.

More specifically, the light rays reflected by the lower surface of diffuse transmission plate 60 at the zone extending in the proximity of its central zone enter the peripheral zone of original picture negative 66 and then the enlarging lens 42. Consequently, the quantity of light transmitted through the peripheral zone of original picture negative 66 is increased.

On the other hand, the light rays reflected by the lower surface of diffuse transmission plate 60 substantially at its central zone enter the original picture negative 66 but do not enter enlarging lens 42. Consequently, the quantity of light transmitted through the central zone of said original picture negative 66 is not increased.

The light rays transmitted through enlarging lens 42 are projected onto photographic paper 46 and the image on original picture negative 66 is formed on photographic paper 46. In this state, exposure is performed and printing-out is achieved at a preset magnification.

For exchange of an original picture negative 66 with another original picture negative 66, carrier 68 is drawn out, the former original picture negative 66 is removed, together with the associated mask 69, then the latter original picture negative 66 is held in the carrier 68 by means of the mask 69 of a size selected so as to be suitable for this original picture negative 66. Finally, carrier 68 is reinserted together with original picture negative 66 held therein by mask 69 associated with this original picture negative 66.

With this embodiment, the light rays coming from the zone extending around the central zone of diffuse transmission plate 60 directly enter original picture negative 66 while the light rays coming from the peripheral zone of diffuse transmission plate 60 are partially reflected by the inner surface of light distribution adjusting box 62 into the peripheral zone of the original picture negative 66 and thus the image to be printed is projected onto the photographic paper after having been transmitted through enlarging lens 42. In this manner, an image that is sufficiently bright to be easily checked is formed on the photographic paper 46. As a result, the operation of focusing is facilitated, exposure time is shortened, and the exposure operation can be rapidly performed.

Of all the light rays transmitted through diffuse transmission plate 60 at its peripheral zone and then reflected by the inner surface of light distribution adjusting box 62 into original picture negative 66, only the light rays reflected by the lower surface of diffuse transmission plate 60 at the zone extending in proximity of its central zone can be transmitted through enlarging lens 42. As a consequence, the image formed on photographic paper 46 has its light density increased in the peripheral zone, but not increased in the central zone, resulting in the entire image being without any significant unevenness in light distribution. Accordingly, the enlarged picture is not adversely affected by deficient light density in the peripheral zone as well as by uneven print-out. As a result, a high quality print-out is achieved.

In addition, the unique arrangement of the light distribution adjusting box that underlies the optical mixer, allows the remainder of the optical diffuser, other than said light distribution adjusting box, to be used in an existing conventional enlarger. In other words, neither additional installation nor drastic rearrangement of the enlarger is necessary. Therefore, a significant refurbishing cost can be avoided.

Now the second embodiment will be described in reference to FIGS. 3 and 4. It should be understood that the parts corresponding to those of the first embodiment shown by FIGS. 1 and 2 are designated by the similar reference numerals.

In the embodiment shown in FIGS. 3 and 4, a box-like drawer 80 underlies head 38 and can be drawn forward relative to head 38. Drawer 80 contains therein a light distribution adjusting box 82 of which the top wall is defined by a diffuse transmission plate 84. Light distribution adjusting box 82 has a side wall 82a and a bottom wall 82b of which the respective inner surfaces are defined by diffuse reflectors. Openings formed in both bottom 82b and said drawer 80 define together a projecting window 82c. Diffuse transmission plate 84, light distribution adjusting box 82, and drawer 80 cooperate together to provide a light distribution adjuster.

A set of drawers 80 are provided so that one of them may be selected depending on each size of the original picture negative 66. For example, the area, the thickness, and the mounting level of diffuse transmission plate 84, as well as the area of projecting window 82c, and height of side wall 82, as the part of said light distribution adjusting box 82, may be dimensioned to be suitable for each size of the original picture negative 66.

The carrier 68 to hold the original picture negative 66 is attached to the bottom of drawer 80. Enlarging lens 42 is provided below original picture negative 66. Table 36, easel 48, and sheet of photographic paper 46 are provided below enlarging lens 42.

Light source 40 including source lamp 72 and reflector 74 and filters 70 are provided behind head 38 in opposition to entrance window 58a of diffusion box 58. Accordingly, all of the light rays emitted from source lamp 72 through filters 70 enter diffusion box 58 through entrance window 58a.

Before the photographic enlarging operation is carried out, drawer 80 is suitably selected for the size of the original picture negative 66 held in carrier 68 by means of mask 69 and inserted under head 38. After the set of filters 70 has been adjusted and source lamp 72 has been turned, light rays are diffusively reflected by the diffuse reflector defining the inner surface of diffusion box 58 and transmitted through diffuse transmission plate 84 defining the upper wall of light distribution adjusting box 82 underlying diffusion box 58 into light distribution adjusting box 58.

The light rays entering light distribution adjusting box 82, as in the case of the first embodiment shown by FIGS. 1 and 2, are partially transmitted through transmission plate 84 at the zone extending in the proximity of its central zone into light distribution adjusting box 82. The light rays then enter original picture negative 66 and are partially transmitted through diffuse transmission plate 84 at the zone in the proximity of its peripheral edge into light distribution adjusting box 58 and then reflected by the diffuse reflector defining the inner surface of light distribution adjusting box 58. The former pan of these light rays is reflected by the lower surface of diffuse transmission plate 84 at the zone extending in the proximity of its central zone into the original picture negative 66 and then enlarging lens 42. The latter part of these light rays is reflected by the lower surface of said diffuse transmission plate 84 at the substantially central zone thereof and then enters the original picture negative 66 but cannot enter enlarging lens 42 due to an excessive angle at which this part of the light rays is reflected by the lower surface of diffuse transmission plate 84.

More specifically, the light rays reflected by the lower surface of diffuse transmission plate 84 at the zone extending in the proximity of its central zone enter the peripheral zone of original picture negative 66 and then enlarging lens 42. Consequently, the quantity of light transmitted through the peripheral zone of said original picture negative 66 is increased, but the light rays reflected by the lower surface of diffuse transmission plate 84 substantially at its central zone enter the original picture negative 66 but cannot enter enlarging lens 42. Consequently, the quantity of light transmitted through the central zone of original picture negative 66 is not increased.

In order to exchange an original picture negative 66 with another original picture negative 66, carrier 68 is drawn out and original picture negative 66 is removed together with the associated mask 69. The original picture negative 66 is then exchanged with a new original picture negative 66. Mask 69 is also exchanged with the one having a size suitable for the new original picture negative 66. Carrier 68 is then reinserted together with the new original picture negative 66 and mask 69. Finally, drawer 80 is drawn out and another drawer 80, which is selected to be suitable for the size of the new original picture negative 66, is inserted into head 38. In this manner, the brightness of the image to be projected onto photographic paper 46 can be maintained substantially at a constant level even when the size of the original negative has been changed.

In this embodiment, photographic paper 46 can be irradiated with a light density suitable for the size of the original picture negative 66 because drawer 80 adapted for the particular size of said original picture negative 66 is inserted into head 38 so that the quantity of light required for proper print-out may be adjusted by light distribution adjusting box 82 contained in drawer 80. As a result, the image projected onto the photographic paper can be maintained substantially at a constant brightness independently of the size of the original picture negative 66. Furthermore, adjustment of exposure time is facilitated.

The light distribution adjuster comprises the transmitting means and the reflecting means so that various factors, such as areas and heights of these transmitting and reflecting means may be appropriately dimensioned in order to provide light distribution adjusters suitable to irradiate the original picture negative having different sizes. Furthermore, the light distribution adjuster can be easily exchanged with another light distribution adjuster because the light distribution adjuster can be detachably connected to the optical mixer. In this way, a set of the light distribution adjusters corresponding to the respective sizes of the original picture negative may be provided and exchange thereof may be performed simultaneously with the original picture negative of a particular size being exchanged with the original picture negative of another size in order to irradiate the photographic paper with the optimum quantity of light for the original picture negative of the particular size. In addition, the changing of size of the original picture negative can be easily and rapidly performed because exchange of the optical mixer, such as the diffusion box which has previously been required, is no longer required.

The feature of the invention that the diffusion box 58 need not be exchanged simultaneously with changing of the size of the original picture negative advantageously allows operation of such size change to be facilitated and thereby allows the time required for the photographic enlargement operation to be shortened.

As will be readily appreciated from the foregoing description the arrangement of the color enlarger head according to the invention includes the light distribution adjuster having the transmitting means and the reflecting means provided adjacent the transmitting means so that the light rays transmitted through the peripheral zone of the transmitting means are reflected by the reflecting means toward the zone extending in proximity of its central zone and then reflected by the lower surface of the transmitting means into the original picture negative and then into the enlarging lens. Consequently, the light rays transmitted through the peripheral zone of the transmitting means are then transmitted through the peripheral zone of the original picture negative and the image projected onto the photographic paper has a light density that is increased in its peripheral zone. On the other hand, of the light rays reflected by the reflecting means, the light rays subsequently reflected by the lower surface of said transmitting means at its central zone are transmitted neither through the original picture negative nor through the enlarging lens, so the image projected onto the photographic paper has a light density that is not increased in its central zone. Accordingly, a bright image having no significant unevenness can be projected onto the photographic paper.

Moreover, the reflecting means as the part of said light distribution adjuster includes the frame extending downward substantially in a vertical direction from the peripheral edge of said transmitting means with the bottom extending inward from the lower end of the frame parallel to said transmitting means so that the light rays directed outward from the peripheral zone of the transmitting means are reflected by the frame and said bottom toward the zone extending around the central zone of the transmitting means. In this manner, the light rays coming from the peripheral zone of the transmitting means can be effectively projected onto the photographic paper.

Diffusion of the light rays can be more reliably achieved by using a diffusion transmission plate as the transmitting means and by using a diffuse reflector as the reflecting means.

The embodiments of the invention in which an exclusive property or privilege is claimed are defined as follows:

1. A color enlarger head provided with a scattering type light diffusion box functioning to diffuse light rays emitted from a light source through filters so as to substantially equalize the light rays respectively colored by said filters and to project said light rays onto an original picture negative held in a mask, comprising:

a mixing box having an inner surface serving as a diffuse reflector and a projecting window through which diffuse light is projected toward the original picture negative; and a light distribution adjusting box positioned between said projecting window and the original picture negative, said light distribution adjusting box including transmitting means opposed and adjacent to said projecting window, a frame extending downward substantially in vertical direction from a peripheral edge of said transmitting means, a bottom portion extending inward from a lower end of said frame in parallel with and spaced apart from said transmitting means and adjacent to said mask, said bottom portion having a central opening smaller in size than said projecting window, and reflecting means provided on an inner surface of said bottom portion facing away from said original picture negative, said light distribution adjusting box being removably engaged with said mixing box;

wherein the light rays transmitted through the peripheral zone of said transmitting means and entering said light distribution adjusting box are partially reflected by said reflecting means toward a zone extending in the proximity of its central zone and reflected by a lower surface of said transmitting means so as to be transmitted through said original picture negative and then through an enlarging lens.

2. The color enlarger head according to claim 1, wherein the transmitting means of said light distribution adjusting box comprises a diffuse transmission plate.

3. The color enlarger head according to claim 2, wherein said diffuse transmission plate has a uniform thickness.

4. The color enlarger head according to claim 2, wherein said reflecting means comprises a diffuse reflector.

5. The color enlarger head according to claim 3, wherein said reflecting means comprises a diffuse reflector.

6. The color enlarger head according to claim 1, wherein said reflecting means comprises a diffuse reflector.

7. A color enlarger head provided with a scattering type light diffusion box functioning to diffuse light rays emitted from a light source through filters so as to equalize the light rays respectively colored by said filters and to project said light rays onto an original picture negative held in a mask, comprising:

a mixing box having an inner surface serving as a diffuse reflector and a projecting window provided adjacent and in opposition to the original picture negative; and a light distribution adjusting box positioned between said mixing box and said original picture negative, said light distribution box including transmitting means opposed to said projecting window and reflecting means provided spaced apart from said transmitting means and adjacent said mask in a peripheral zone of said transmitting means, said light distribution adjusting box being removably engaged with said mixing box;

wherein the light rays transmitted through the peripheral zone of said transmitting means and entering said light distribution adjusting box are partially reflected by said reflecting means toward a zone extending around a central zone of said transmitting means and then reflected by a lower surface of said transmitting means so as to be transmitted through said original picture negative and then through an enlarging lens.

8. The color enlarger head according to claim 7, wherein the transmitting means and the reflecting means of said light distribution adjusting box are separately removably attached to said mixing box.

9. The color enlarger head according to claim 8, wherein the reflecting means of said light distribution adjusting box includes a frame extending downward substantially in a vertical direction from a peripheral edge of said transmitting means and a bottom extending inward from a lower end of said frame in parallel with said transmitting means and having a central opening.

10. The color enlarger head according to claim 9, wherein said transmitting means comprises a diffuse transmission plate.

11. The color enlarger head according to claim 10, wherein said diffuse transmission plate has a uniform thickness.

12. The color enlarger head according to claim 9, wherein said reflecting means comprises a diffuse reflector.

13. The color enlarger head according to claim 8, wherein said transmitting means comprises a diffuse transmission plate.

14. The color enlarger head according to claim 13, wherein said diffuse transmission plate has a uniform thickness.

15. The color enlarger head according to claim 8, wherein said reflecting means comprises a diffuse reflector.

16. The color enlarger head according to claim 7, wherein the transmitting means and the reflecting means of said light distribution adjusting box are integral with each other and said light distribution adjusting box is removably attached to said mixing box.

17. The color enlarger head according to claim 16, wherein the reflecting means of said light distribution adjusting box includes a frame extending downward substantially in a vertical direction from a peripheral edge of said transmitting means and a bottom extending inward from a lower end of said frame in parallel with said transmitting means and having a central opening.

18. The color enlarger head according to claim 17, wherein said transmitting means comprises a diffuse transmission plate.

19. The color enlarger head according to claim 18, wherein the transmitting means of said light distribution adjusting box comprises the diffuse transmission plate of a uniform thickness.

20. The color enlarger head according to claim 17, wherein said reflecting means comprises a diffuse reflector.

21. The color enlarger head according to claim 16, wherein said transmitting means comprises a diffuse transmission plate.

22. The color enlarger head according to claim 21, wherein said diffuse transmission plate has a uniform thickness.

23. The color enlarger head according to claim 16, wherein said reflecting means comprises a diffuse reflector.

24. The color enlarger head according to claim 7, wherein the reflecting means of said light distribution adjusting box includes a frame extending downward substantially in a vertical direction from a peripheral edge of said transmitting means and a bottom extending inward from a lower end of said frame in parallel with said transmitting means and having a central opening.

25. The color enlarger head according to claim 24, wherein the transmitting means of said light distribution adjusting box comprises a diffuse transmission plate.

26. The color enlarger head according to claim 25, wherein said diffuse transmission plate has a uniform thickness.

27. The color enlarger head according to claim 24, wherein said reflecting means comprises a diffuse reflector.

28. The color enlarger head according to claim 7, wherein said transmitting means comprises a diffuse transmission plate.

29. The color enlarger head according to claim 28, wherein said diffuse transmission plate has a uniform thickness.

30. The color enlarger head according to claim 29, wherein said reflecting means comprises a diffuse reflector.

31. The color enlarger head according to claim 28, wherein said reflecting means comprises a diffuse reflector.

32. The color enlarger head according to claim 7, wherein said reflecting means comprises a diffuse reflector.

* * * * *